United States Patent
Chuang et al.

(10) Patent No.: US 9,571,880 B2
(45) Date of Patent: Feb. 14, 2017

(54) PIXEL CLOCK GENERATION CIRCUIT AND METHOD THEREOF

(71) Applicant: REALTEK SEMICONDUCTOR CORPORATION, Hsinchu (TW)

(72) Inventors: Bing-Juo Chuang, Hsinchu (TW); Feng-Cheng Chang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 123 days.

(21) Appl. No.: 14/500,360

(22) Filed: Sep. 29, 2014

(65) Prior Publication Data

US 2015/0116594 A1    Apr. 30, 2015

(30) Foreign Application Priority Data

Oct. 29, 2013  (TW) .............................. 102139184 A

(51) Int. Cl.
  *H04N 5/067*    (2006.01)
  *H04N 21/43*    (2011.01)

(52) U.S. Cl.
  CPC ................................ *H04N 21/4305* (2013.01)

(58) Field of Classification Search
  None
  See application file for complete search history.

(56) References Cited

U.S. PATENT DOCUMENTS

| | | | |
|---|---|---|---|
| 7,142,187 B1 * | 11/2006 | Kim ......................... | G09G 5/18 345/100 |
| 7,483,450 B1 * | 1/2009 | Giese .................... | H04J 3/0673 370/503 |
| 7,929,919 B2 * | 4/2011 | Coppin ............... | G06F 13/4295 331/172 |
| 7,969,507 B2 | 6/2011 | Kim | |
| 2006/0001494 A1 * | 1/2006 | Garlepp .................... | H03L 7/23 331/2 |

(Continued)

FOREIGN PATENT DOCUMENTS

CN    1960461 A    5/2007

OTHER PUBLICATIONS

Office Action from the counterpart Taiwan application No. 102139184 mailed Aug. 31, 2015.

(Continued)

*Primary Examiner* — Ashish K Thomas
(74) *Attorney, Agent, or Firm* — WPAT, P.C., Intellectual Property Attorneys; Anthony King

(57) ABSTRACT

This invention discloses circuits and methods for generating a pixel clock. The circuits utilize an image signal of a first format to generate a pixel clock, which can be utilized to generate an image signal of a second format. The circuits include a reference clock generation circuit, an image processing circuit, and a clock adjustment circuit. The reference clock generation circuit generates a reference clock. The image processing circuit processes the image signal of the first format to generate a control signal. The clock adjustment circuit, which is coupled to the reference clock generation circuit and the image signal processing circuit, generates the pixel clock according to the reference clock and the control signal. The control signal is substantially a periodic signal, whose frequency is proportional to the frequency of a synchronization signal of the image signal of the second format.

20 Claims, 8 Drawing Sheets

(56) References Cited

U.S. PATENT DOCUMENTS

| | | | | |
|---|---|---|---|---|
| 2007/0097263 A1* | 5/2007 | Kim | ................... | G09G 5/005 |
| | | | | 348/521 |
| 2011/0164273 A1* | 7/2011 | Masui | ................ | G03G 15/043 |
| | | | | 358/1.14 |

OTHER PUBLICATIONS

Search Report from the counterpart Taiwan application No. 102139184 mailed Aug. 31, 2015.
English abstract translation of the Office Action from the counterpart Taiwan application No. 102139184 mailed Aug. 31, 2015.
Office Action dated Nov. 9, 2016 for counterpart China application No. 201310538250.6.
Search report dated Nov. 9, 2016 for counterpart China application No. 201310538250.6.
English abstract translation of the Office Action dated Nov. 9, 2016 for counterpart China application No. 201310538250.6.
U.S. Pat. No. 7,969,507 is the counterpart for CN 1960461 A.

* cited by examiner

PIXEL CLOCK GENERATION CIRCUIT AND METHOD THEREOF

BACKGROUND OF THE INVENTION

1. Field of the Invention

The present invention relates to a pixel clock generation circuit and the method thereof, especially to a circuit and a method thereof that utilize a reference clock inside a chip to generate a pixel clock.

2. Description of Related Art

Please refer to FIG. 1, illustrating a functional block diagram of a prior art circuit that transforms a DisplayPort image signal to a video graphics array (hereinafter referred to as VGA) image signal. The DisplayPort image signal is processed by the clock data recovery (hereinafter referred to as CDR) circuit 110 and a link clock is generated. The decoder 120 decodes the DisplayPort image signal by referring to the link clock and generates data signals. The data signals comprise image data, such as RGB and YUV image data, a control signal and other characteristic signals. The clock generation circuit 130 generates a stable pixel clock and the format generation circuit 140 transforms the image data to VGA image signals according to the pixel clock. As a result, the image signal that originally belongs to the link clock domain is now transformed to an image signal that belongs to the pixel clock domain. The VGA image signals are converted by the Digital-to-Analog converter (hereinafter referred to as DAC) 150 to form analog image signals and are also processed by the horizontal synchronization (hereinafter referred to as Hsync) and vertical synchronization (hereinafter referred to as Vsync) signal generation circuit 160 to generate an Hsync signal and a Vsync signal.

The correctness of the VGA image signals generated by the format generation circuit 140 is highly dependent on the accuracy of the pixel clock. According to the specification of DisplayPort 1.2a, the signals generated by the decoder 120 comprise characteristic signals such as Mvid and Nvid, which can be utilized to find the frequency of the pixel clock by the following equation:

$$f_{pixelCLK} = f_{linkCLK} \times (Mvid/Nvid) \quad (1)$$

$f_{pixelCLK}$ is the frequency of the pixel clock, and $f_{linkCLK}$ is the frequency of the link clock ° Please refer to FIG. 2, illustrating a functional block diagram of the clock generation circuit 130 shown in FIG. 1. The clock generation circuit 130 comprises a reference clock generator 131, a fractional-N synthesizer 136 and a frequency setting circuit 137. The fractional-N synthesizer 136 and the frequency setting circuit 137 are integrated in the video format transformation chip, and the reference clock generator 131 is mounted on the circuit board on which the video format transformation chip installs. The reference clock generator 131 is often implemented by a crystal oscillator, which generates a reference clock with extremely accurate frequency. The fractional-N synthesizer 136 generates the required pixel clock according to the reference clock and a setting value of the frequency setting circuit 137. For example, if the frequency of the reference clock is 25 MHz and the setting value is 4.32, the frequency of the pixel clock generated by the fractional-N synthesizer 136 will be 25M*4.32=108 MHz, which corresponds to a resolution of 1280*960@60 Hz of the VGA image signal; and if the setting value is 4.76, the pixel clock generated by the fractional-N synthesizer 136 will be 25M*4.76=119 MHz, which corresponds to a resolution of 1680*1050@60 Hz of the VGA image signal. The setting value of the frequency setting circuit 137 can be obtained according to the frequency of the reference clock and the frequency of the pixel clock found according to the aforementioned equation (1).

The aforementioned method, however, has some drawbacks. Firstly, the reference clock generator mounted on the circuit board not only increases the overall cost but also is not compatible with the design of miniaturized electronic devices due to the large size of the crystal oscillator. Secondly, the installation of the reference clock generator on the circuit board takes up the circuit board areas and the additional wirings on the circuit board may likely cause electromagnetic interferences. Moreover, the new DisplayPort 1.2 specification supports a multi-stream transport (MST) display technology, which makes the characteristic signals Mvid and Nvid not related to the pixel clock anymore, and therefore the frequency of the pixel clock cannot be found by equation (1). In light of the above drawbacks, the present invention provides different solutions.

SUMMARY OF THE INVENTION

In consideration of the imperfections of the prior art, an object of the present invention is to provide a pixel clock generation circuit and a pixel clock generation method, so as to make an improvement to the prior art.

The present invention discloses a pixel clock generation circuit, which comprises: a reference clock generation circuit for generating a reference clock; an image processing circuit, for processing an image signal of a first format to generate a control signal; and a clock adjustment circuit, coupled to the reference clock generation circuit and the image processing circuit, for generating a pixel clock according to the reference clock and the control signal. The pixel clock can be used to generate an image signal of a second format. The control signal is substantially periodic and the frequency of the control signal is proportional to the frequency of a synchronization signal of the image signal of the second format.

The present invention also discloses a pixel clock generation method, which comprises steps of: generating a reference clock; processing an image signal of a first format to generate a control signal; and generating a pixel clock according to the reference clock and the control signal. The pixel clock can be used to generate an image signal of a second format. The control signal is substantially periodic and the frequency of the control signal is proportional to the frequency of a synchronization signal of the image signal of the second format.

The clock generation circuit and its related method of the present invention can generate an accurate pixel clock, and a video format transformation chip that utilizes the pixel clock generation circuit and method of the present invention is not required to install an additional reference clock generator, such as a crystal oscillator, on the circuit board to transform the image signal from a first format to a second format. Because there will be no additional reference clock generator on the circuit board, the areas of the circuit board can be saved and the wirings on the circuit board can be reduced to decrease the electromagnetic interference. In addition, a circuit board with a smaller area is more suitable for miniaturized electronic devices.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms of this invention field. If any term is defined in the specification, such term should be explained accordingly. Besides, the connection between objects or events in the following embodiments can be direct or indirect provided that these embodiments are still applicable under such connection. Said "indirect" means that an intermediate object or a physical space exists between the objects, or an intermediate event or a time interval exists between the events. The present invention discloses a pixel clock generation circuit and a pixel clock generation method, and the detail known in this field will be omitted if such detail has little to do with the features of the present invention. People of ordinary skill in the art can choose components or steps equivalent to those described in this specification to carry out the present invention, which means that the scope of this invention is not limited to the embodiments in the specification. On account of that some or all elements of said device invention could be known, the detail of such elements will be omitted provided that this omission nowhere dissatisfies the specification and enablement requirements. Besides, said method invention can be in the form of firmware and/or software which could be carried out by the device of this invention or the equivalent thereof; hence, the following description on the method invention will focus on the processes and steps instead of the hardware without dissatisfying the specification and enablement requirements.

Figure 1:
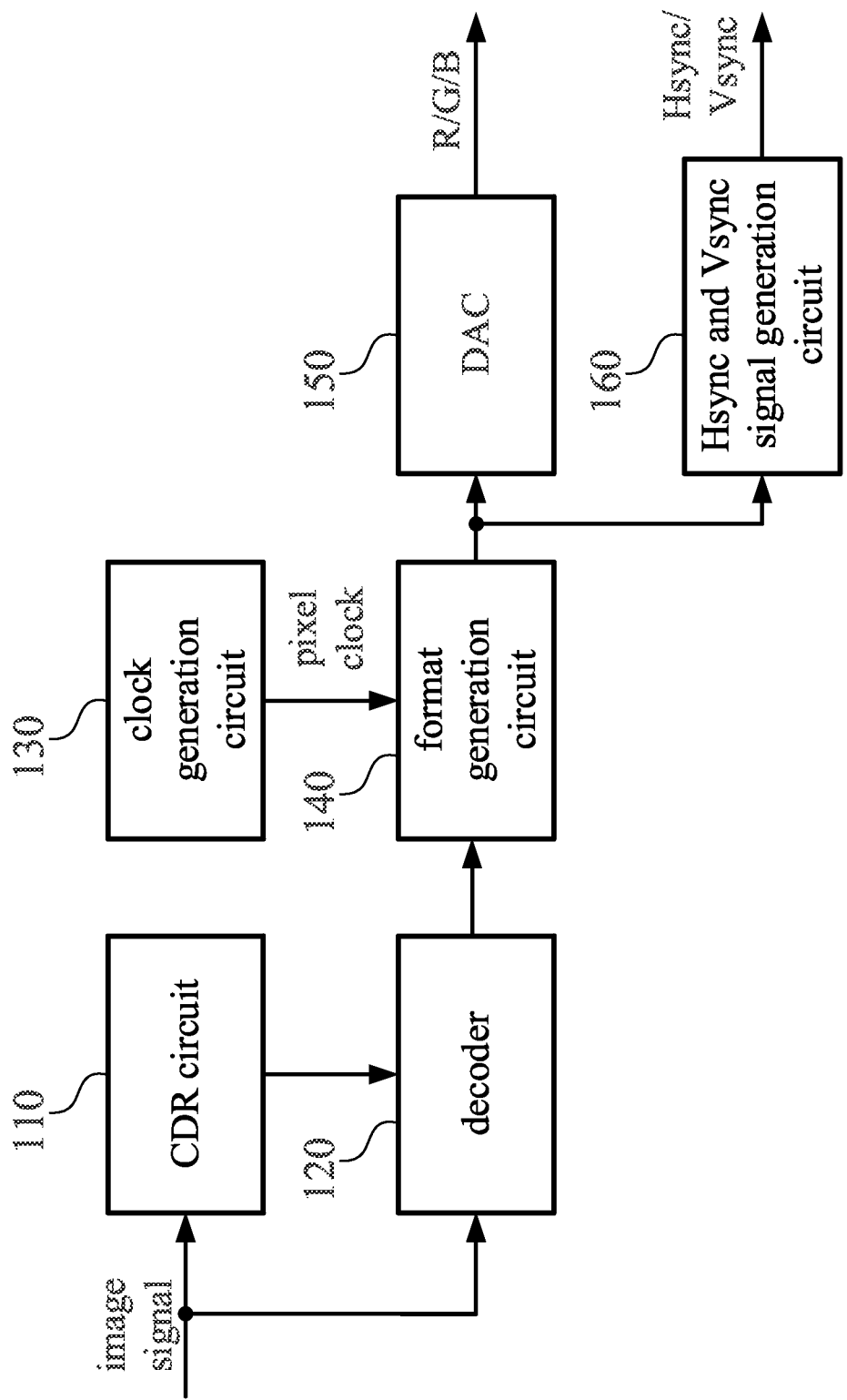
FIG. 1 illustrates a functional block diagram of a prior art circuit that transforms a DisplayPort image signal to a VGA image signal.
Figure 2:
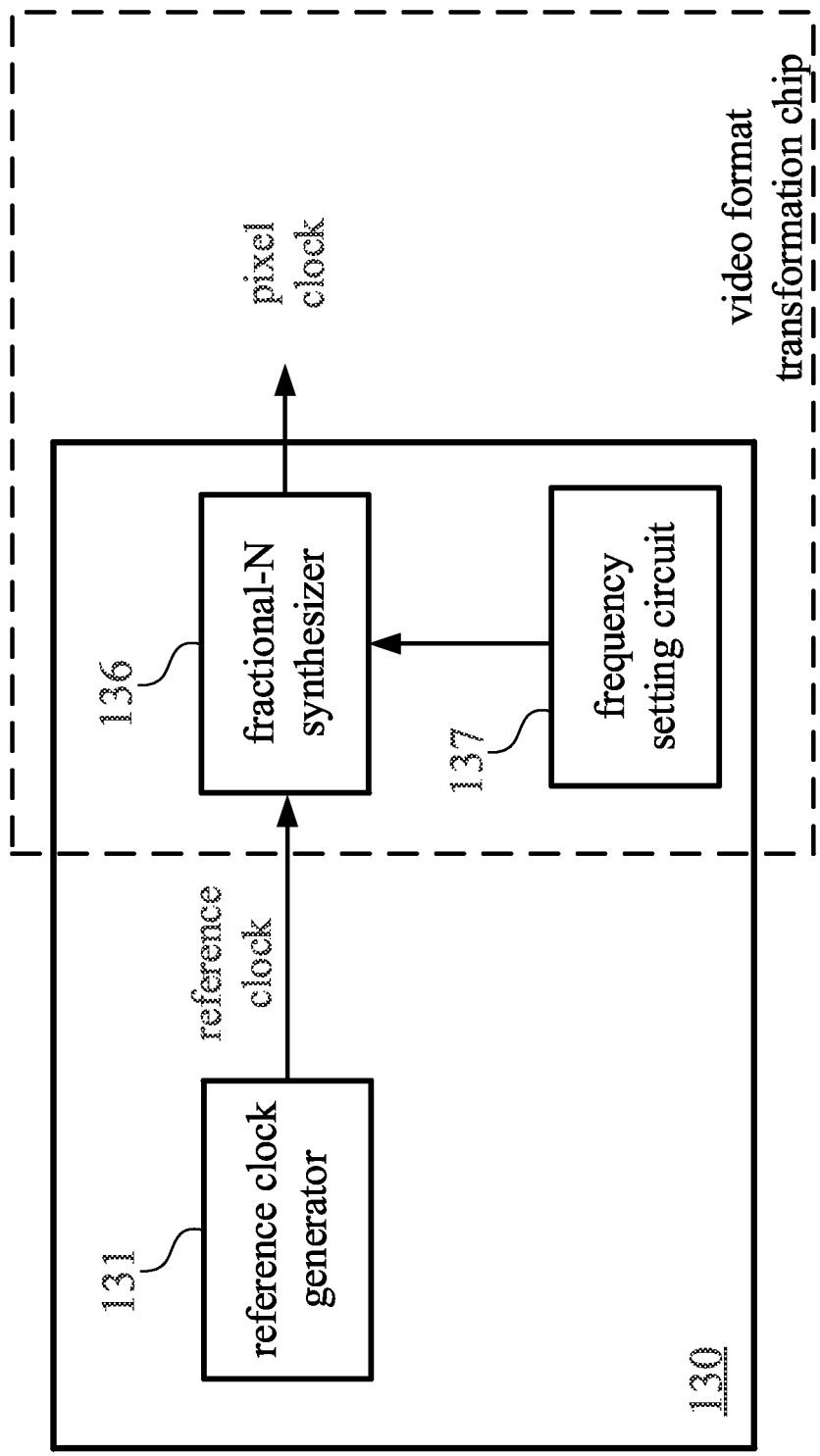
FIG. 2 illustrates a functional block diagram of the clock generation circuit 130 shown in FIG. 1.
Figure 3:
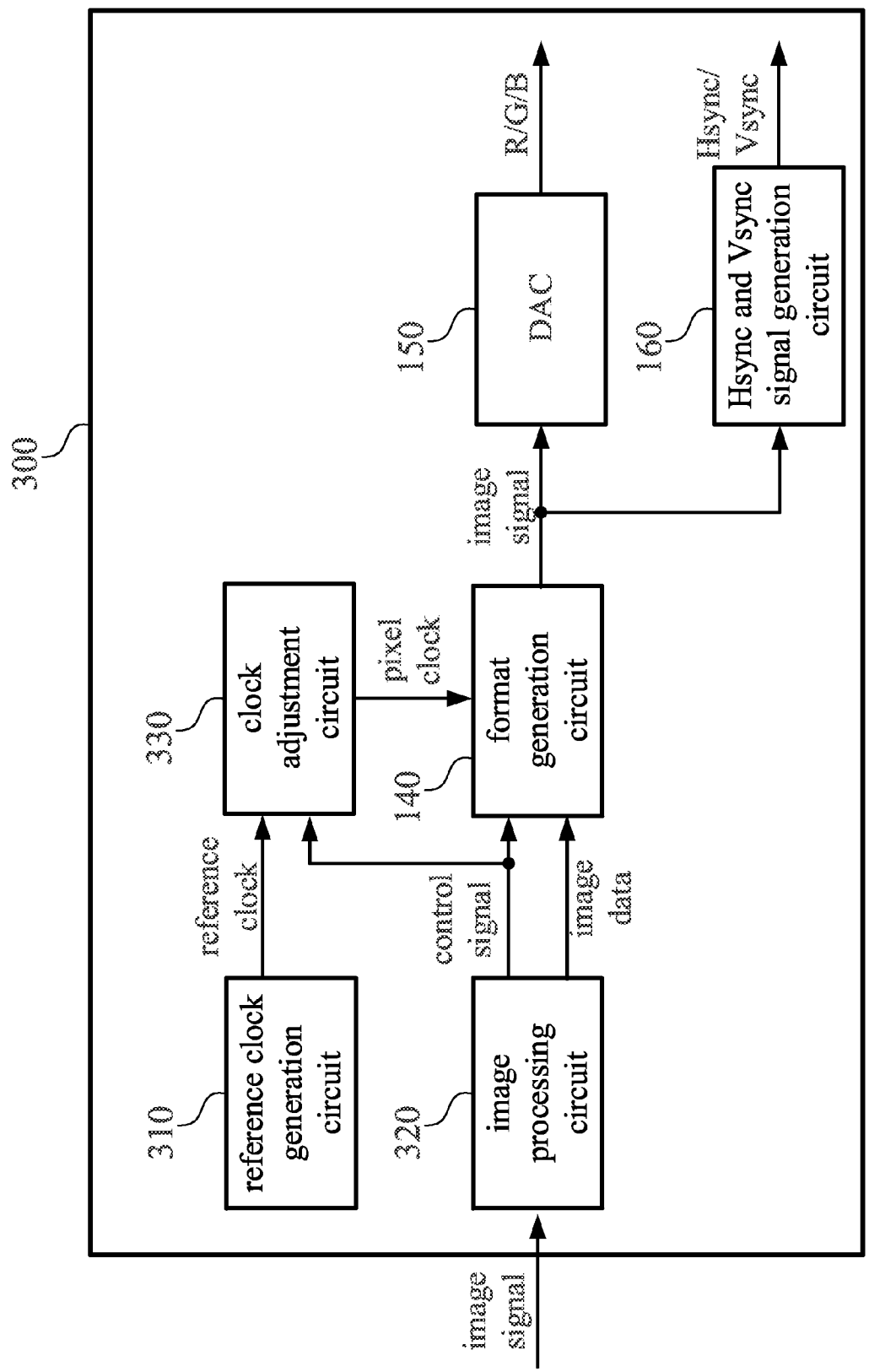
FIG. 3 illustrates a functional block diagram of a video format transformation chip according to a preferred embodiment of the present invention.
Figure 4:
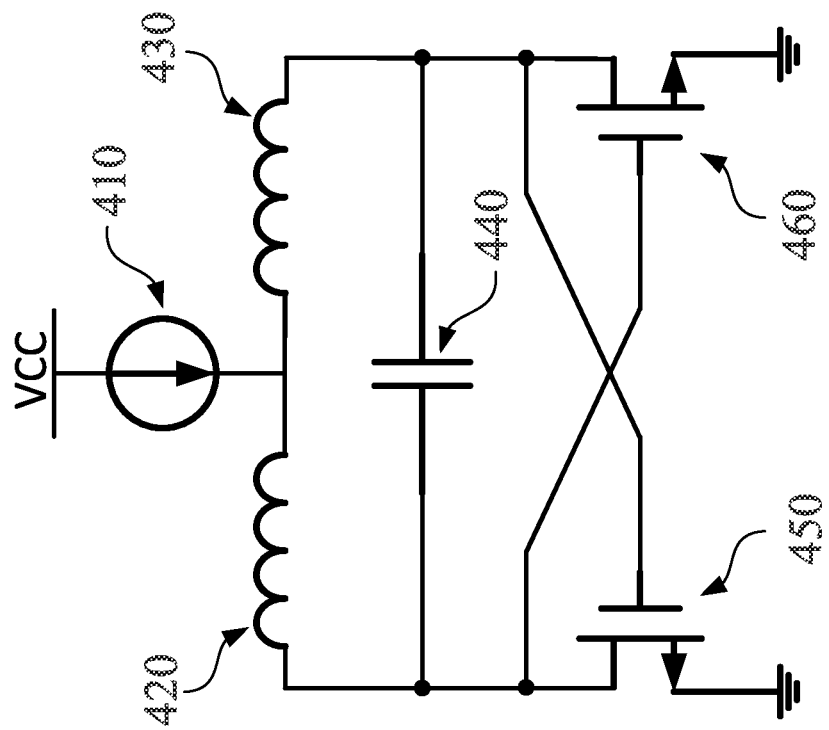
FIG. 4 illustrates the circuit of an LC tank.

Please refer to FIG. 3, illustrating a functional block diagram of a video format transformation chip according to a preferred embodiment of the present invention. A video format transformation chip 300 comprises a reference clock generation circuit 310, an image processing circuit 320, a clock adjustment circuit 330, the format generation circuit 140, the DAC 150, and the Hsync and Vsync signal generation circuit 160. The reference clock generation circuit 310 is an active clock generation circuit. The term active means that the reference clock generation circuit 310 is able to generate a reference clock by itself without referring to any other signals. In a preferred embodiment, the reference clock generation circuit 310 can be implemented by an LC tank. The circuitry of the LC tank is depicted in FIG. 4 and comprises a current mirror 410, inductors 420 and 430, a capacitor 440 and transistors 450 and 460. The LC tank is well-known to those of ordinary skill in the art and the details are therefore omitted for brevity. Other active clock generation circuits that is not sensitive to temperatures and voltages and has small jitters can also be used as the reference clock generation circuit 310 of the present invention. Please refer to FIG. 3 again. The image processing circuit 320 obtains a link clock from the DisplayPort image signal and decodes the DisplayPort image signal according to the link clock to generate image data and a control signal. The image data are data carried by the data signals, such as RGB or YUV data. The control signal is a periodic signal whose frequency is related to the frequency of the synchronization signals (e.g., an Hsync signal or a Vsync signal) generated by the Hsync and Vsync signal generation circuit 160. The clock adjustment circuit 330 generates a pixel clock according to the reference clock and the control signal. The format generation circuit 140 receives the control signal and the image data, and transforms the image signal which originally belongs to the link clock domain to an image signal which belongs to the pixel clock domain by referring to the pixel clock. The image signal in the pixel clock domain is then processed by the DAC 150 and the Hsync and Vsync signal generation circuit 160 to respectively generate an analog image signal and the Hsync signal Hsync and the Vsync signal Vsync.

In the embodiment of FIG. 3, the clock adjustment circuit 330 generates the pixel clock according to the outputs of the reference clock generation circuit 310 and the image processing circuit 320, so the reference clock generation circuit 310, the image processing circuit 320, and the clock adjustment circuit 330 can be regarded as a pixel clock generation circuit of the present invention. In some circumstances, variations in the manufacturing processes of the capacitors and inductors of the LC tank in FIG. 4 may cause errors in the capacitance values and the inductance values, resulting in frequency deviations. Even if the frequency deviation is little, the DisplayPort image signal and the VGA image signal become gradually unsynchronized after the video format transformation chip operates for a long time, which will eventually cause problems to the displayed image. On the other hand, since the characteristic signals Mvid and Nvid cannot be used as reference signals anymore in the DisplayPort 1.2 specification, the frequency of the pixel clock cannot be found. Therefore, the present invention discloses a pixel clock generation circuit that is able to provide an accurate pixel clock under the circumstances that the reference clock is not quite accurate and the frequency of the pixel clock is unknown.

Figure 5:
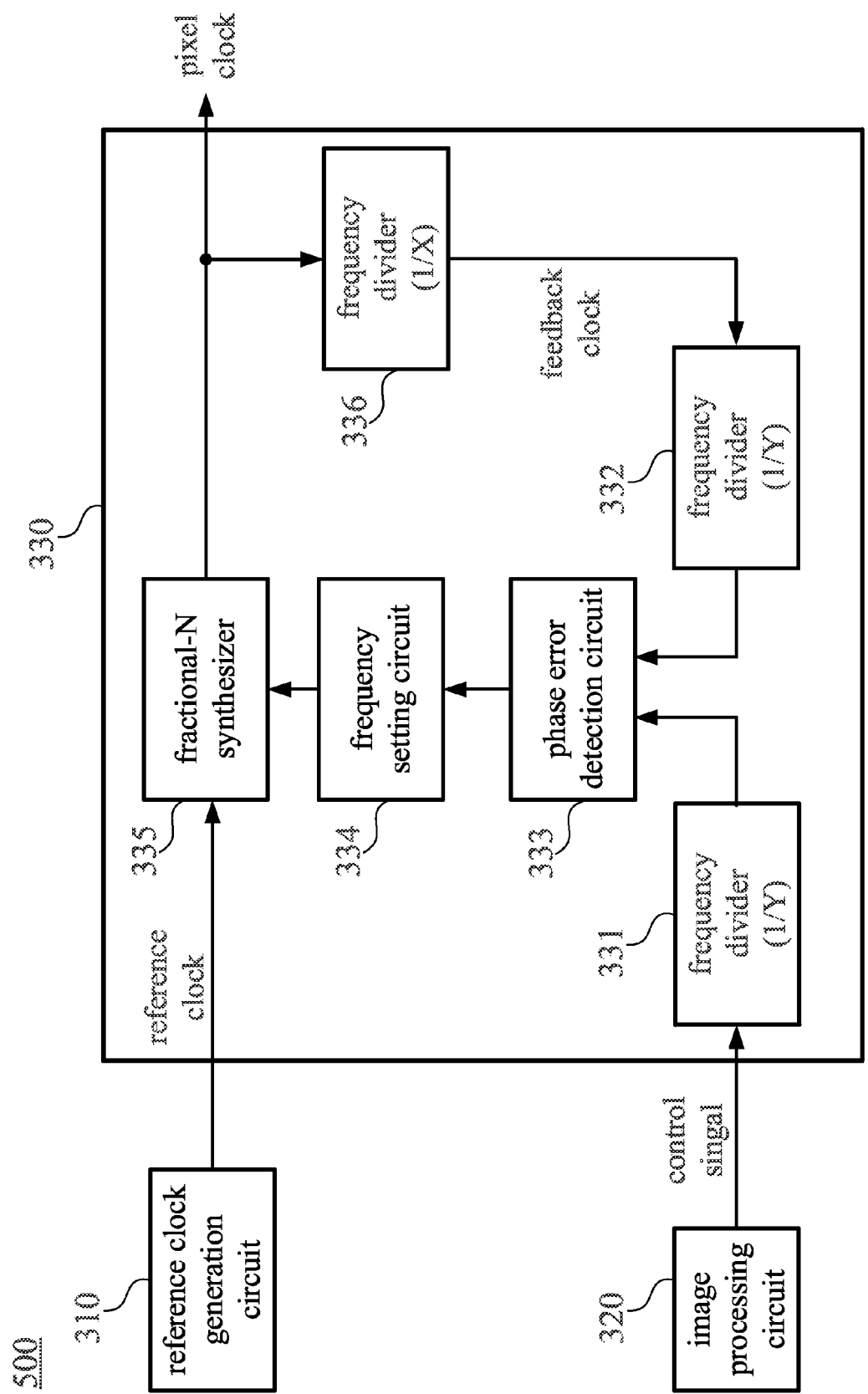
FIG. 5 illustrates a functional block diagram of the pixel clock generation circuit according to an embodiment of the present invention.

Please refer to FIG. 5, illustrating a functional block diagram of the pixel clock generation circuit according to an embodiment of the present invention. The pixel clock generation circuit 500 comprises the reference clock generation circuit 310, the image processing circuit 320, and the clock adjustment circuit 330. The clock adjustment circuit 330 comprises frequency dividers 331, 332, and 336, a phase error detection circuit 333, a frequency setting circuit 334, and a fractional-N synthesizer 335. The control signal generated by the image processing circuit 320 is divided by the frequency divider 331 and then transmitted to the phase error detection circuit 333. The phase error detection circuit 333 refers to the frequency-divided control signal and a feedback clock that is divided by the frequency divider 332 to generate phase error information. The feedback clock is generated by dividing the pixel clock with the frequency divider 336. The phase error information represents the phase difference and a phase relation (early or late) between the divided control signal and the divided feedback clock. The frequency setting circuit 334 generates setting values according to the phase error information. The fractional-N synthesizer 335 generates the pixel clock according to the setting values and the reference clock. The frequency setting circuit 334 can be implemented by a proportional-integral controller (PI controller). The frequency setting circuit 334 and the fractional-N synthesizer 335 are well-known to those of ordinary skill in the art and the details are therefore omitted for brevity.

In a preferred embodiment, the control signal is a control symbol BS (abbreviation for blanking start) carried by the DisplayPort image signal on its main link. The control symbol BS is a periodic signal, whose frequency is equal to the frequency of the Hsync signal of the VGA image signal. The VGA image signal comprises a plurality of pixel lines, each comprising Htotal pixels, where Htotal is a positive integer. The frequency of the control symbol BS ($f_{BS}$) is also equal to the frequency of the pixel clock ($f_{pixelCLK}$) divided by Htotal:

$$f_{BS} = f_{pixelCLK}/H\text{total} \quad (2)$$

The divisor X of the frequency divider 336 is equal to Htotal, which makes the frequency of the feedback clock equal to the frequency of the control signal. The phase error detection circuit 333, the frequency setting circuit 334, and the fractional-N synthesizer 335 adjust the reference clock according to the phase error information of the feedback clock and the control signal to generate the pixel clock that has correct frequency and phase. The number Htotal can be obtained or parsed from a main stream attributes (MSA) packet of the main link. Moreover, the DisplayPort image signal carries a spread-spectrum signal on the main link, whose frequency is often 33 kHz, and a frequency range of the control symbol BS is in the range of 15 kHz-200 kHz. Because these two frequencies are so close that the control symbol BS will be probably influenced by the spread-spectrum signal, the accuracy of the phase error detection circuit 333 may not be very good. Therefore, before being transmitted to the phase error detection circuit 333, the control symbol BS is divided by the frequency divider 331 using a divisor Y to decrease its frequency so that the influence of the spread-spectrum signal is reduced. Y is a positive number larger than 1. A large Y value can decrease the overall loop bandwidth to filter out the spread-spectrum signal, and thus a pixel clock with smaller jitter can be obtained. On the other hand, to meet the frequency decrease of the control signal, the feedback clock is also divided by the frequency divider 332 using the same divisor Y so the divided feedback clock has the same frequency as the divided control signal. In a preferred embodiment, the frequency divider 332 and the frequency divider 336 can be combined into a signal frequency divider, whose divisor is X×Y.

In addition to the control symbol BS, the DisplayPort image signal also carries another periodic control signal VBID[0] on the main link that can be used by the present invention. The frequency of the control signal VBID[0] is equal to the frequency of the Vsync signal of the VGA image signal. That is, the frequency of the control signal VBID[0] is equal to the frequency of the pixel clock divided by the number of pixels in a frame of the VGA image signal. Each frame of the VGA image signal comprises Vtotal pixel lines and each pixel line comprises Htotal pixels, where Vtotal is a positive integer. Hence, the frequency of the control signal VBID[0] ($f_{VBID[0]}$) is $$f_{VBID[0]} = f_{pixelCLK}/(H\text{total} \times V\text{total}) \quad (3)$$

In this case, the divisor of the frequency divider 336 is set to be Htotal×Vtotal. A frame often comprises a plurality of pixel lines so $f_{VBID[0]}$ is much smaller than $f_{BS}$, which means that the frequency of the control signal VBID[0] is much smaller than the frequency of the spread spectrum signal and therefore the control signal VBID[0] is not influenced by the spread spectrum signal easily. Under this circumstances, the divisors of the frequency divider 331 and the frequency divider 332 can set to be 1, which is identical to a circuit without the frequency divider 331 and the frequency divider 332. Similarly, the number Vtotal can be obtained or parsed from the MSA packet of the main link.

Figure 6:
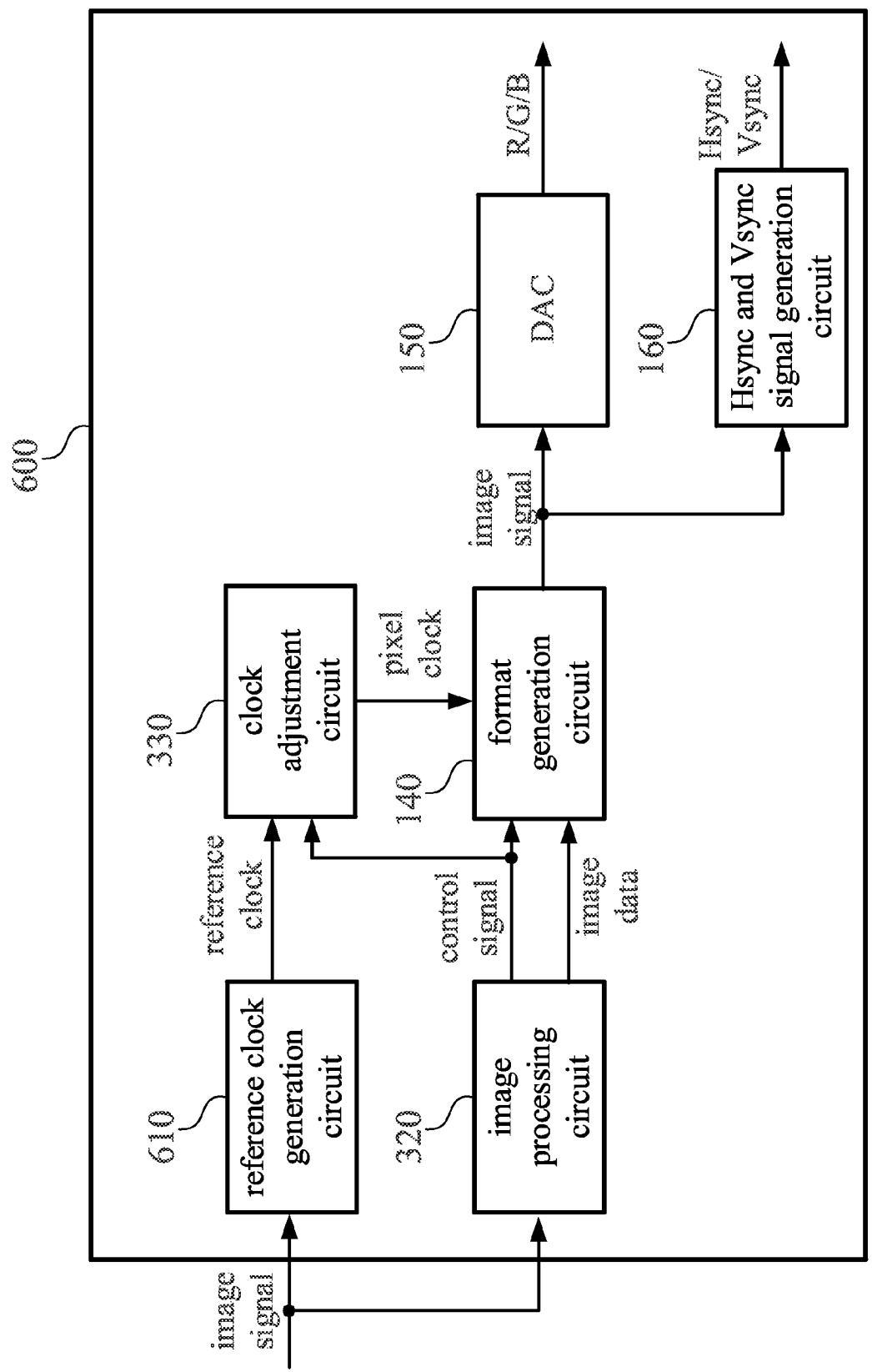
FIG. 6 illustrates a functional block diagram of the video format transformation chip according to another embodiment of the present invention.

To sum up, even if the reference clock outputted by the reference clock generation circuit 310 may have frequency deviation and the frequency of the pixel clock is unknown, the present invention can still generate a pixel clock that has accurate frequency. The present invention also discloses another preferred embodiment. Please refer to FIG. 6, illustrating a functional block diagram of the video format transformation chip according to another embodiment of the present invention. The video format transformation chip 600 comprises a reference clock generation circuit 610, the image processing circuit 320, the clock adjustment circuit 330, the format generation circuit 140, the DAC 150 and the Hsync and Vsync signal generation circuit 160. In this embodiment, the reference clock generation circuit 610 can be implemented by a CDR circuit. A link clock can be obtained from the DisplayPort image signal by the CDR technology and is used as a reference clock, according to which the clock adjustment circuit 330 generates the pixel clock. The image processing circuit 320 decodes the DisplayPort image signal to generate a control signal and image data that are outputted to the format generation circuit 140. The functions of the format generation circuit 140, the DAC 150, and the Hsync and Vsync signal generation circuit 160 are the same as the embodiment disclosed in FIG. 3 and are therefore omitted for brevity.

Figure 7:
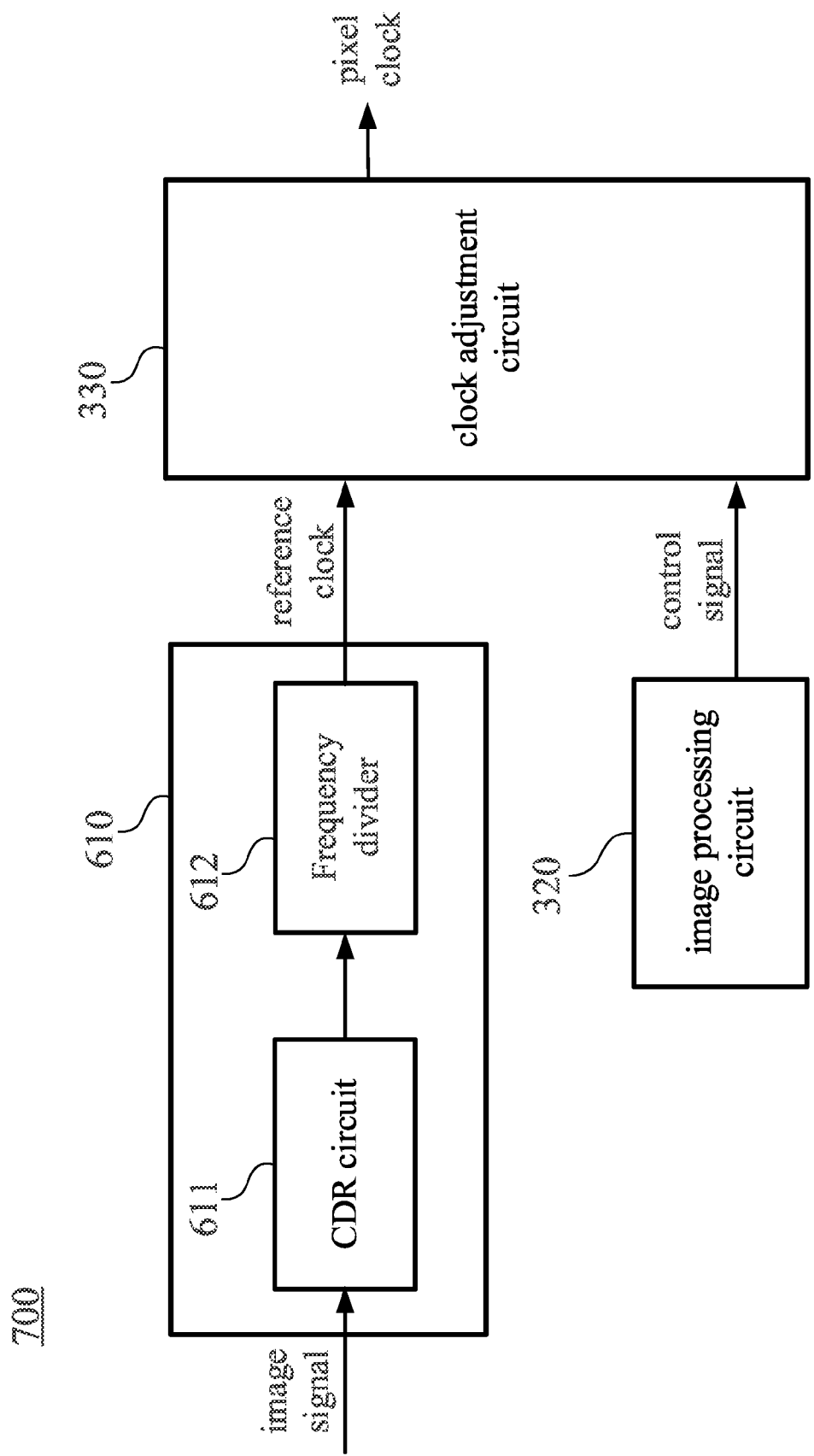
FIG. 7 illustrates a functional block diagram of the pixel clock generation circuit according to another embodiment of the present invention.

In this embodiment, the clock adjustment circuit 330 generates the pixel clock according to the outputs of the reference clock generation circuit 610 and the image processing circuit 320, so the reference clock generation circuit 610, the image processing circuit 320 and the clock adjustment circuit 330 are regarded as the pixel clock generation circuit of the present invention. Please refer to FIG. 7, illustrating a functional block diagram of the pixel clock generation circuit according to another embodiment of the present invention. The pixel clock generation circuit 700 comprises the reference clock generation circuit 610, the image processing circuit 320, and the clock adjustment circuit 330. The reference clock generation circuit 610 comprises a CDR circuit 611 and a frequency divider 612. The functions of the image processing circuit 320 and the clock adjustment circuit 330 are identical to the embodiment disclosed in FIG. 5, and are therefore omitted for brevity. The link clock generated by the CDR circuit 611 has a relatively stable frequency. The frequency of the link clock may be 162 MHz, 270 MHz or 540 MHz corresponding to different DisplayPort transmission rates. At a receiving end of DisplayPort (i.e. the video format transformation chip of the present invention), this frequency information can be obtained from a main link so the clock adjustment circuit 330 can obtain the frequency of the reference clock. The clock adjustment circuit 330 can generate a pixel clock with accurate frequency by referring to the control signal and the reference clock at the same time, which are detailed in the embodiment of FIG. 5.

Since the link clock may be a spread-spectrum signal, the link clock is divided by the frequency divider 612 before being transmitted to the clock adjustment circuit 330 to suppress the interference of the spread-spectrum signal to the pixel clock. The frequency of the spread-spectrum signal is in a range of 30 kHz~33 kHz. As long as the frequency of the divided reference clock is less than one tenth of the frequency of the spread-spectrum signal (i.e. about 3 kHz), the interference of the spread-spectrum signal can be greatly reduced. The divisor of the frequency divider 612 can be set according to the frequency of the link clock and the frequency of the spread-spectrum signal. In another embodiment, the function of the frequency divider 612 can be replaced by setting a bandwidth of the fractional-N synthesizer 335 of the clock adjustment circuit 330 to be under 3 kHz; consequently even if the reference clock generation circuit 610 does not have the frequency divider 612, the pixel clock generation circuit 700 can also reduce the interference of the spread-spectrum signal.

Figure 8:
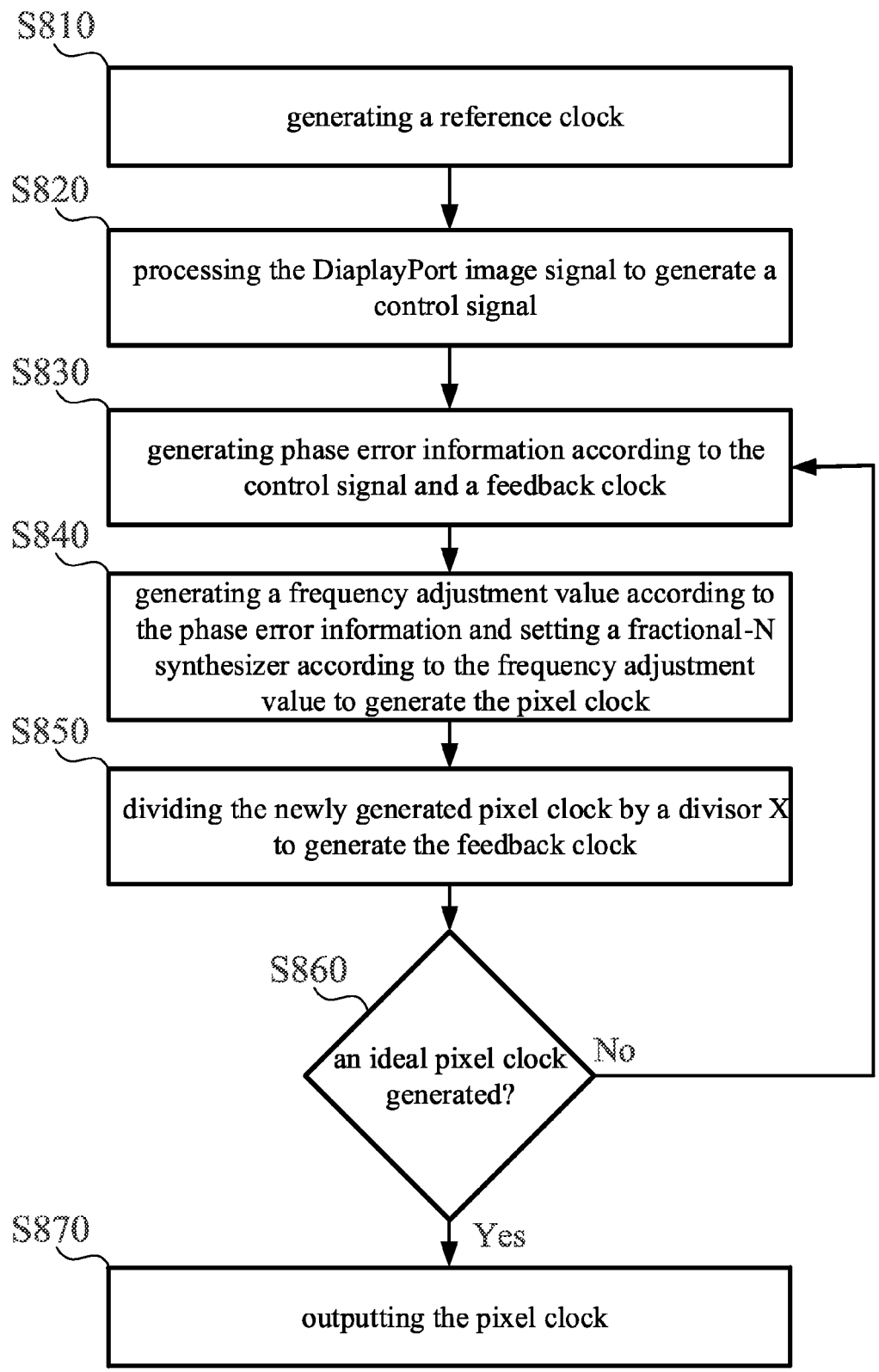
FIG. 8 illustrates a flow chart of a pixel clock generation method according to an embodiment of the present invention.

Please refer to FIG. 8, illustrating a flow chart of a pixel clock generation method according to an embodiment of the present invention. In addition to the aforementioned pixel clock generation circuit, the present invention also correspondingly discloses a pixel clock generation method. The generated pixel clock can be used to transform the DisplayPort image signal to the VGA image signal. The method is executed by the aforementioned pixel clock generation circuit or its equivalent device. The pixel clock generation method utilizes the DisplayPort image signal to generate the pixel clock, which is used to generate the VGA signal. As shown in FIG. 8, one embodiment of the present invention comprises steps of:

Step S810: generating a reference clock to be used as a reference for generating the pixel clock;

Step S820: processing the DisplayPort image signal to generate a control signal. A main link of the DisplayPort carries a periodic control signal, such as a control symbol BS having a frequency identical to that of the Hsync signal of the VGA image signal or a control signal VBID[0] having a frequency identical to that of the Vsync signal of the VGA image signal. The frequency of the control signal is related to that of the pixel clock so the control signal is used as a reference for generating the pixel clock. Therefore, the following steps use the reference clock and the control signal to generate the pixel clock;

Step S830: generating phase error information according to the control signal and a feedback clock. A ratio of the frequency of the pixel clock to that of the feedback clock is a particular number. The phase error information represents the phase difference and a phase relation (early or late) between the control signal and the feedback clock, and also implies whether the frequency of the pixel clock is correct;

Step S840: generating a frequency adjustment value according to the phase error information and setting a fractional-N synthesizer according to the frequency adjustment value. The fractional-N synthesizer generates the pixel clock according to the frequency adjustment value and the reference clock;

Step S850: dividing the newly generated pixel clock by a divisor X to generate the feedback clock;

Step S860: determining whether an ideal pixel clock is generated. As stated in the step S830, a ratio of the frequency of the pixel clock to that of the feedback clock is a particular number, and the divisor X is that particular number. When the control signal in step S820 is the control symbol BS, the divisor X is the number of pixels (Htotal) contained in a pixel line of the VGA image signal. As a result, when the frequency of the pixel clock becomes stable, the frequency of the feedback clock is identical to that of the control symbol BS. Similarly, when the control signal in step S820 is the control signal VBID[0], the divisor X is the number of pixels contained in a frame of the VGA image signal; i.e. the divisor X is a product of the number of pixel lines (Vtotal) and the number Htotal. As a result, when the frequency of the pixel clock becomes stable, the frequency of the feedback clock is identical to that of the control signal VBID[0]. In short, the phase error information generated in step S830 implies whether the frequency of the pixel clock is correct. If the generated pixel clock is not the correct or ideal pixel clock, go back to step S830; otherwise, go to the next step S870; and Step S870: outputting the pixel clock.

To summarize, the pixel clock generation method of the present invention can generate a correct pixel clock according to the DisplayPort image signal despite that the frequencies of the reference clock and the pixel clock are unknown. The number Htotal, which represents the number of pixels in a pixel line, and the number Vtotal, which represents the number of pixel lines in a frame, can be obtained from a MSA packet of the main link of the DisplayPort image signal. Since the main link of the DisplayPort image signal often carries a spread spectrum signal, to reduce the interferences of the spread spectrum signal, the pixel clock generation method of the present invention further comprises the following step: dividing the control signal and the feedback clock by a divisor Y. The detailed operations are disclosed in the embodiment of the pixel clock generation circuit, and are therefore omitted for brevity.

Since people of ordinary skill in the art can appreciate the implementation detail and the modification thereto of the present method invention of FIG. 8 through the disclosure of the device invention of FIG. 5 and FIG. 7, repeated and redundant description is thus omitted. Please note that there is no step sequence limitation for the method inventions as long as the execution of each step is applicable. Furthermore, the shape, size, and ratio of any element and the step sequence of any flow chart in the disclosed figures are just exemplary for understanding, not for limiting the scope of this invention. Besides, each aforementioned embodiment may include one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A pixel clock generation circuit, comprising:
   a reference clock generation circuit for generating a reference clock;
   an image processing circuit, for processing an image signal of a first format to generate a control signal; and
   a clock adjustment circuit, coupled to the reference clock generation circuit and the image processing circuit, for generating a pixel clock according to the reference clock and the control signal, the pixel clock being able to be used to generate an image signal of a second format;
   wherein, the control signal is substantially periodic and the frequency of the control signal is proportional to the frequency of a synchronization signal of the image signal of the second format.

2. The pixel clock generation circuit of claim 1, wherein the synchronization signal is a horizontal synchronization signal and the frequency of the control signal is substantially equal to the frequency of the horizontal synchronization signal.

3. The pixel clock generation circuit of claim 2, wherein the image signal of the second format comprises a plurality of pixel lines and the clock adjustment circuit comprises:
   a detection circuit, coupled to the image processing circuit, for generating phase error information according to the control signal and a feedback clock;
   a setting circuit, coupled to the detection circuit, for generating a setting value according to the phase error information;
   a frequency synthesizer, coupled to the reference clock generation circuit and the setting circuit, for generating the pixel clock according to the setting value and the reference clock; and
   a frequency divider, coupled to the frequency synthesizer and the detection circuit, for dividing the pixel clock by a divisor N to generate the feedback clock, the divisor N equal to the number of pixels in a pixel line.

4. The pixel clock generation circuit of claim 3, wherein the clock adjustment circuit further comprises:
   a first additional frequency divider, coupled to the image processing circuit and the detection circuit, for dividing the control signal by a divisor M and outputting the divided control signal to the detection circuit, M being a positive number larger than 1; and
   a second additional frequency divider, coupled to the frequency divider and the detection circuit, for dividing the feedback clock by the divisor M and outputting the divided feedback clock to the detection circuit.

5. The pixel clock generation circuit of claim 1, wherein the synchronization signal is a vertical synchronization signal and the frequency of the control signal is substantially equal to the frequency of the vertical synchronization signal.

6. The pixel clock generation circuit of claim 5, wherein the image signal of the second format comprises a plurality of frames and the clock adjustment circuit comprises:
   a detection circuit, coupled to the image processing circuit, for generating phase error information according to the control signal and a feedback clock;
   a setting circuit, coupled to the detection circuit, for generating a setting value according to the phase error information;
   a frequency synthesizer, coupled to the reference clock generation circuit and the setting circuit, for generating the pixel clock according to the setting value and the reference clock; and
   a frequency divider, coupled to the frequency synthesizer and the detection circuit, for dividing the pixel clock by a divisor N to generate the feedback clock, the divisor N equal to the number of pixels in a frame.

7. The pixel clock generation circuit of claim 6, wherein the clock adjustment circuit further comprises:
   a first additional frequency divider, coupled to the image processing circuit and the detection circuit, for dividing the control signal by a divisor M and outputting the divided control signal to the detection circuit, M being a positive number larger than 1; and
   a second additional frequency divider, coupled to the frequency divider and the detection circuit, for dividing the feedback clock by the divisor M and outputting the divided feedback clock to the detection circuit.

8. The pixel clock generation circuit of claim 1, wherein the first image signal of the first format is a DisplayPort image signal, and the image signal of the second format is a VGA image signal.

9. The pixel clock generation circuit of claim 1, wherein the reference clock generation circuit comprises:
   an LC tank.

10. The pixel clock generation circuit of claim 1, wherein the reference clock generation circuit comprises:
    a clock data recovery circuit, for generating the reference clock according to the image signal of the first format.

11. The pixel clock generation circuit of claim 10, wherein the reference clock generation circuit further comprises:
    a frequency divider, coupled to the clock data recovery circuit, for dividing the reference clock and outputting the divided reference clock to the clock adjustment circuit.

12. The pixel clock generation circuit of claim 1 being comprised in a video format transformation chip, and the video format transformation chip transforming the image signal of the first format to the image signal of the second format.

13. A pixel clock generation method, comprising:
    generating a reference clock;
    processing an image signal of a first format to generate a control signal; and
    generating a pixel clock according to the reference clock and the control signal, the pixel clock being able to be used to generate an image signal of a second format;
    wherein, the control signal is substantially periodic and the frequency of the control signal is proportional to the frequency of a synchronization signal of the image signal of the second format.

14. The pixel clock generation method of claim 13, wherein the synchronization signal is a horizontal synchronization signal and the frequency of the control signal is substantially equal to the frequency of the horizontal synchronization signal.

15. The pixel clock generation method of claim 14, wherein the image signal of the second format comprises a plurality of pixel lines and the step of generating the pixel clock according to the reference clock and the control signal comprises:
    generating phase error information according to the control signal and a feedback clock;
    generating a setting value according to the phase error information;
    generating the pixel clock according to the setting value and the reference clock; and
    dividing the pixel clock by a divisor N to generate the feedback clock, the divisor N equal to the number of pixels in a pixel line.

16. The pixel clock generation method of claim 15, further comprising:
dividing the control signal by a divisor M, M being a positive number larger than 1; and
dividing the feedback clock by the divisor M;
wherein the step of generating phase error information according to the control signal and the feedback clock utilizes the divided control signal and the divided feedback clock.

17. The pixel clock generation method of claim 13, wherein the synchronization signal is a vertical synchronization signal and the frequency of the control signal is substantially equal to the frequency of the vertical synchronization signal.

18. The pixel clock generation method of claim 17, wherein the image signal of the second format comprises a plurality of frames, and the step of generating the pixel clock according to the reference clock and the control signal comprises:
generating phase error information according to the control signal and a feedback clock;
generating a setting value according to the phase error information;
generating the pixel clock according to the setting value and the reference clock; and
dividing the pixel clock by a divisor N to generate the feedback clock, the divisor N equal to the number of pixels in a frame.

19. The pixel clock generation method of claim 18, further comprising:
dividing the control signal by a divisor M, M being a positive number larger than 1; and
dividing the feedback clock by the divisor M;
wherein the step of generating phase error information according to the control signal and the feedback clock utilizes the divided control signal and the divided feedback clock.

20. The pixel clock generation method of claim 13, wherein the first image signal of the first format is a DisplayPort image signal, and the image signal of the second format is a VGA image signal.

* * * * *